US012782958B2

(12) United States Patent
Wells et al.

(10) Patent No.: US 12,782,958 B2
(45) Date of Patent: Nov. 3, 2026

(54) STATION KEEPING DECOYS

(71) Applicants: Tim Wells, Canton, IL (US); Guy Letourneau, Cave Creek, AZ (US)

(72) Inventors: Tim Wells, Canton, IL (US); Guy Letourneau, Cave Creek, AZ (US)

( * ) Notice: Subject to any disclaimer, the term of this patent is extended or adjusted under 35 U.S.C. 154(b) by 0 days.

(21) Appl. No.: 19/096,613

(22) Filed: Mar. 31, 2025

(65) Prior Publication Data

US 2025/0306595 A1 Oct. 2, 2025

Related U.S. Application Data

(60) Provisional application No. 63/573,388, filed on Apr. 2, 2024.

(51) Int. Cl.

| | |
|---|---|
| ***A01M 31/06*** | (2006.01) |
| ***G05D 1/248*** | (2024.01) |
| ***G05D 1/611*** | (2024.01) |
| ***H01Q 1/34*** | (2006.01) |
| *G05D 107/00* | (2024.01) |
| *G05D 109/30* | (2024.01) |

(52) U.S. Cl.
CPC ............. *G05D 1/611* (2024.01); *A01M 31/06* (2013.01); *G05D 1/248* (2024.01); *H01Q 1/34* (2013.01); *G05D 2107/25* (2024.01); *G05D 2109/34* (2024.01)

(58) Field of Classification Search
CPC ............................... A01M 31/06; G05D 1/611
See application file for complete search history.

(56) References Cited

U.S. PATENT DOCUMENTS

| | | | | |
|---|---|---|---|---|
| 4,612,722 A * | 9/1986 | Ferrell | A01M 31/06 | 43/26.1 |
| 5,377,439 A * | 1/1995 | Roos | A01M 31/06 | 43/3 |
| 5,636,466 A * | 6/1997 | Davis | A01M 31/06 | 43/3 |
| 5,775,022 A * | 7/1998 | Sumrall | A01M 31/06 | 446/156 |
| 10,212,929 B2 * | 2/2019 | Janzen, Jr. | A01M 31/06 | |
| 2009/0188148 A1 * | 7/2009 | Orris | A01M 31/06 | 43/2 |
| 2019/0250602 A1 * | 8/2019 | DeLoach, III | A01M 31/06 | |
| 2021/0141379 A1 * | 5/2021 | DeLoach, III | G08C 17/02 | |
| 2024/0114892 A1 * | 4/2024 | Bruns | A63H 23/10 | |

* cited by examiner

*Primary Examiner* — Richard G Davis

(57) ABSTRACT

A station keeping waterfowl system includes at least one self propelled station keeping waterfowl decoy and a homing buoy each having water resistant housings, with at least a portion of the decoy housing having a form of a waterfowl. The decoy and buoy each include batteries, microprocessors, and power switches. The decoy includes a motor driven propeller, a motor driven rudder, and a receiving array of antennae for radio direction finding and radio ranging to the buoy. The receiving array is a T-array of antennae comprising a first transverse linear array and a second longitudinal linear array. The homing buoy emits a homing signal and the one or more waterfowl decoys autonomously navigate to remain within a predetermined radius around the buoy. The system includes a simple handheld controller which preferably comprises no more than two switches or buttons.

20 Claims, 6 Drawing Sheets

STATION KEEPING DECOYS

CROSS REFERENCE TO RELATED APPLICATION

This application claims the benefit of and priority to US Provisional Application 63/573,388 "Station Keeping Decoys," filed Apr. 2, 2024. The entire contents of US Provisional Application 63/573,388 "Station Keeping Decoys," filed Apr. 2, 2024 are hereby incorporated into this document by reference. The appendices of technical information for designing and building antenna arrays and radio circuits and for designing and programming microprocessors included in the provisional filings are also hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to decoys that resemble animals and that hunters use to attract game animals, and more specifically floating decoys resembling waterfowl and which are self-propelled.

BACKGROUND

Waterfowl hunters have long used realistic looking models resembling the game animals they wish to take. Many decoys have long been designed to float in fresh water or salt water. Floating decoys are preferably designed to maintain upright orientation against wave action, and some decoys achieve this by including a weighted keel.

Some motorized decoys are available that have articulated portions that are moveable by motor power, such as for flapping wings or for simulating "dabbling" motions. Dabbling is an action wherein a waterfowl dips its head below water to seek underwater food such as fish, insects, or plant matter. This foraging action often attracts other animals that instinctually interpret seeking food to be indicative of the presence of food.

Other decoys include battery-powered motor-driven propellers and a rudder which may be fixed in a position other than amidships so that in still water on a windless day the decoy would theoretically swim in a circle around a fixed point. Another type of invention related to the field but outside the scope of the invention is a battery powered motorized pod with a propeller and a clamp which may be attached to the submerged underside of a decoy and set at an angle to the keel to drive the decoy in theoretical circles as above. The battery may be a unitary dry cell or wet cell, or may be a battery pack which is an assembly of individual cells wired in series or in parallel or in series-parallel for providing a desired current and voltage output. The battery may include user-replaceable cells wherein depleted cells may be replaced with fresh, fully charged cells which themselves may be disposable or rechargeable cells. Alternatively, the battery may be a permanently installed rechargeable unit or assembly.

Unfortunately, in the presence of any current or wind, these motorized decoys will likely fail to remain within their initially intended area of operation. Some hunters tether motor-powered self-propelled decoys to an anchor so that prevailing winds and currents do not carry off the decoy out of position. Setting an anchored decoy involves wading into water, leaving the hunter cold and wet during the waiting time for game to approach. Although wading into water to retrieve decoys may be necessary at the conclusion of a hunting session, it may be preferable to not require a hunter having to get wet and cold at the beginning of the session. Furthermore, anchoring a self-propelled decoy causes the decoy to drive in arcs as it reaches the limit of the anchor line, and the resulting motion may not accurately mimic the natural feeding or flocking motions of the waterfowl being simulated. Live birds approaching such a decoy may detect the unnatural motions of the decoy and may decide not to approach or to settle elsewhere, meaning that the decoy has failed in its purpose of attracting game birds to a target area.

In comparison to self-propelled motorized hunting decoys where motor speed and rudder angle are substantially not controllable remotely, radio controlled model ship hobbyists have long enjoyed the ability to launch a model vessel and steer it to go where they wish while varying course and speed and ability to maintain position against at least mild winds and currents. Unfortunately, modern controllers for model vessels are often expensive and very complex to operate, in part because they are fashioned to offer a subset of the controls and information available on the bridge of a real ship and usually include a plethora of features and functions which are extremely irrelevant to waterfowl hunting: controlling replica smoke and horns, transmitting model "engine room" status, bilge pump alerts, and azimuth and elevation control of warship turrets.

The earliest commercial radio position and navigation systems for marine industries began developing in the 1940s, and within a few decades successful deployments of global networks of radio beacons first abetted and then eclipsed lighthouses. Later systems such as LORAN (LOng RAnge Navigation) were superseded by satellite navigation. In tandem with the advances of global marine navigation have come solutions for automating the work of navigating a vessel at sea, to include systems for maintaining relative positioning of multiple ships within a fleet, such as for military escort or other surface warfare tactical formations and for fuel transfer between ships. Another use of automated station keeping systems for marine vessels is for transferring crude oil from stationary offshore oil platforms to crude oil tankers and barges.

Hunters enjoy hunting and many do not want to add extremely complicated equipment to their activities, especially if the additional gear would require new or exacting skills beyond the scope of interest and enthusiasm for the hunt. Market demand for a free-swimming, motorized decoy that is able to replicate natural swimming motions while remaining near a pre-determined position remains unmet, in part because radio controllers for models present too many controls and functions where what is desired is a simple "set and forget" operation.

BRIEF DESCRIPTION

The invention is an easy-to-use, set-and-forget self-propelled floating decoy that includes a station keeping function and a course randomizing function. The remote controller for the decoy is simplified so as to include only two buttons with no joystick or steering actuators typically associated with motorized floating toys and models. The two buttons may even be combined into a single detented or latch-and-release button wherein a first "push-in" latches the button in a mostly recessed position for "on," "set," or "go" command, and a second push releases the button to an extended position for an "off," or "stop" command.

Therefore a primary objective of the invention is to provide a self-propelled decoy able to float and move about in fresh water and salt water. A corollary objective of the invention is to protect the internal electronics and power source from corrosion or short circuits, especially when operating in salt water.

Another objective of the invention is to provide for the decoy a course randomizing function so that over time, the internal electronics or software of the decoy generate diverse rudder commands that steer the decoy away from a straight course in the water.

Yet another objective of the invention is to provide to the decoy a station keeping function so that once a station point is set, the decoy will bias its steering commands so as to remain within a specified radial distance of the station point while steering randomly as long as it is within the specified distance of the station point.

Yet another objective of the invention is to provide a controller devoid of any controls or actuators other than a few simple push buttons, such as only one labeled "Set" or "Go," and one other labeled "Stop," or a latch-and-release button to activate and deactivate the system.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION OF CERTAIN EMBODIMENTS

Figure 1:
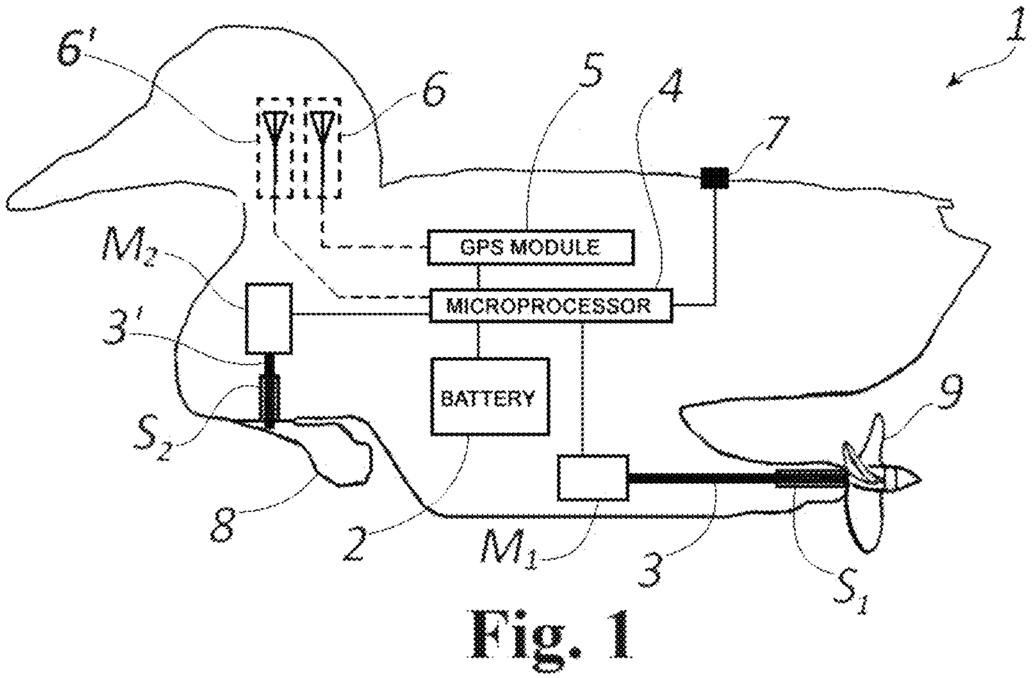
FIG. 1 shows a stylized schematic view of a preferred embodiment of a self-propelled station keeping decoy waterfowl in accordance with the invention.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that include more than one unit, unless specifically stated otherwise. Where grammatical genders are concerned, a "user" of the invention may be of any gender regardless of any specific pronouns or grammar used in this specification. Thus, masculine grammatical forms may be interpreted to include and subsume feminine or any other grammatical genders.

In this specification the phrase "operably coupled" and its derivative phrases such as "for operably coupling," when used such as "[A] is operably coupled to [B]" means that when [A] is operated then [B] is caused to operate. The operation of [B] in response to [A] may incorporate but not be limited to a direct relation, a proportional relation, or an inverse relation, and time delays may be designed in between the actuation of device or controller [A] and the behavior of [B.] The phrase "[A] is operably coupled to [C] by means of [B]" means that [A] is operably coupled to [B] and [B] is operably coupled to [C,] so that the intermediate component or system [B] may act as a modulating influence on the operation of component or system [C] in response to actuations of device or controller [A.] The operation of [C] in response to [A] may incorporate but not be limited to a direct relation, a proportional relation, or an inverse relation. Time delays may be incorporated between [A] and [B] or between [B] and [C] or both between [A] and [B] and between [B] and [C.]

The invention is a station keeping waterfowl system that includes at least one self propelled station keeping waterfowl decoy and a homing buoy, each having water resistant housings, with at least a portion of the decoy housing having a form of a waterfowl. The decoy and buoy each include batteries, microprocessors, and power switches. The decoy includes a motor driven propeller, a motor driven rudder, and a receiving array of antennae for radio direction finding and radio ranging to the buoy. The receiving array is a T-array of antennae comprising a first transverse linear array and a second longitudinal linear array. The homing buoy emits a homing signal and the one or more waterfowl decoys autonomously navigate to remain within a predetermined radius around the buoy. The system includes a simple handheld controller which preferably includes no more than two switches or buttons.

Referring now to the figures, FIG. 1 shows a stylized schematic view of a preferred embodiment of a self-propelled station keeping decoy waterfowl [1] in accordance with the invention. The body of the decoy is fashioned as a waterproof housing with at least one removable access port or panel which exposes the inner machinery and electronics for inspection and maintenance but resists water entry to a reasonable maximum depth, which for the expected market would typically be around 100 feet or less, which works out to about three atmospheres of overpressure in fresh water and more if the decoy were to be lost in salt water.

A battery [2] or battery pack comprising a plurality of batteries supplies electrical power to a microprocessor [4] and a GPS (Global Positioning System) module [5.] The battery or batteries may be rechargeable, and may be permanently installed within the decoy, or they may be disposable replaceable batteries, or designed to be removed from the decoy for recharging in a recharging module. The microprocessor may include a PCA (Printed Circuit Assembly) such as an Ardiuno® microprocessor or a similar programmable controller small enough to fit inside a volume representative of the body of a waterfowl. The microprocessor in this specification may refer to a single PCA or an interconnected assembly of more than one circuit board, such as a microprocessor attached to a motor controller, wherein the microprocessor includes the navigation decision-making software within its electronic hardware and transmits control signals to the motor controller which directs higher current power to the motors in the decoy. An Arduino® PCA is about 2.0 inches by 2.6 inches and about 0.6 inches thick or less, and some recent versions of these modules have been miniaturized to half this size or even less. The microprocessor in this specification may also include a daughter board for receiving radio control signals, and this daughter board may include a radio receiving antenna or may be connected to the discreet second antenna [6'] for receiving signals other than GPS or GNSS signals received by the GPS module. In another embodiment within the scope of the invention, a single antenna designed to receive GPS or GNSS signals within a first frequency band and also receive radio control signals within a second frequency band is operably coupled to a frequency splitter which for this specification is considered part of the microprocessor assembly. The frequency splitter splits navigation signals on GPS frequencies such as 1227.60 MHz or 1575.42 MHz, or GNSS signals received on frequencies such as 1176.45 MHz, versus hobby radio control signals received on frequencies such as 35 MHz, 75 MHz, or 2.4 GHz. Alternatively, the decoy may be configured to receive telecommand signals for its "set" and "standby" operation modes by infrared or ultra-violet light received by one or more optical sensors mounted on the decoy or also located at the eyes in the head of the decoy.

GPS or GNSS (Global Navigation Satellite System) processor modules [5] are available in sizes of about 1.45 inches by 1.6 inches or smaller. Some of these modules include a receiving antenna but others require a discrete antenna [6] to be operably connected to the GPS or GNSS module. Depending on performance, it may be preferable to locate the discrete antenna as high above water as is practicable within the volume of the decoy and so in this figure the optional antenna is shown within the head of the waterfowl. A power switch [7] is preferably located in a dorsal section of the decoy body for ready access, but in other embodiments within the scope of the invention it may be located elsewhere, including an internal switch actuated by twisting the head of the decoy, wherein an "on" position has the head positioned with the bird's bill and head aligned forwards, and an "off" position may be designed with the bill and head twisted 30° or more away from a forward orientation.

The decoy is self-propelled by means of a first motor [$M_1$] for propulsion which drives a propeller shaft [3] to which a propeller [9] is attached. The first motor is operably connected to the microprocessor or a motor drive controller board which is part of a microprocessor assembly. The decoy assembly may also include weed guards (not shown) such as a ring or a segment of a ring following at least a portion of the perimeter of the swept volume of the propeller blades. The decoy also includes a rudder [8] which in this embodiment is located forward under the head of the decoy body. In alternate embodiments the rudder may be located beneath the keel of the decoy or, as is typical for marine vessels, located abaft of the propeller.

The rudder is driven by a second motor [$M_2$] which is preferably a stepper motor designed to rotate the rudder shaft [3'] clockwise and counterclockwise but also to hold the rudder in any of various predetermined positions rather than making complete revolutions. Stepper motors are preferable as they receive commands for rotating the rudder and also for holding the rudder in position against reaction forces of the water while maneuvering.

The problem of sealing out water from places where rotatable shafts pass through a hull or membrane submerged in water has challenged marine engineers for centuries, beginning with American inventor David Bushnell in 1775. The decoy may use modern shaft seal glands or more economical "stuffing boxes." Because stepwise and intermittent rotation of the rudder shaft differs from continuous rotation of the propeller shaft, the design and sizing of the propeller shaft stuffing box [$S_1$] may differ from the stuffing box [$S_2$] for the rudder shaft.

Figure 2:
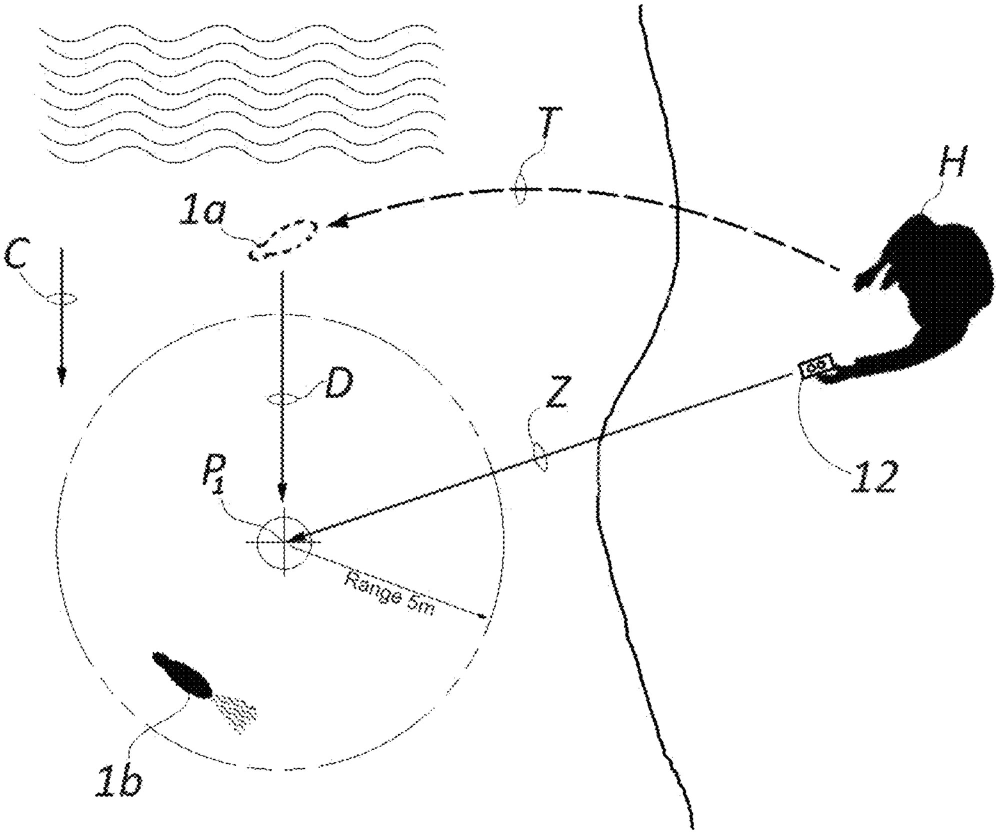
FIG. 2 shows a stylized top view of a user of the inventive waterfowl decoy of FIG. 1 with some usage steps for setup and operation of the decoy.

FIG. 2 shows a stylized top view of a user of the inventive waterfowl decoy of FIG. 1 with some usage steps for setup and operation of the decoy. After actuating the power switch of the decoy to "on", and deciding where it is desired to locate the inventive self-propelled station keeping decoy, the user [H] observes the water to estimate if wind or current or both would pull a non-powered floating decoy off position. In this specification, the combined forces of moving water and wind acting upon the decoy to displace it from a desired location are referred to as "drift" and designated as a vector shown by arrow [C.] Drift may be determined by throwing an expend-able floating object such as a stick into the water and observing which direction it may be carried off. The user then compensates for the estimated drift by throwing the decoy into the water along an arc [T] so that the decoy lands at a point [1*a*] upstream from a desired operating location of for the decoy. The center of the desired operating location is a set point [$P_1$.] The radius of operation of 5 meters is an exemplary value and the system may be configured to shepherd one or more decoys within a radius of any preferred size.

The drift wind or current or both carries the decoy along arrow [D] into the desired operating location, whereupon the user presses a first "set" button on the handheld controller which emits a radio command [Z] received and delivered to the microprocessor within the decoy. This radio command may be received by a second antenna [6'] other than the GPS or GNSS antenna used for navigating the decoy. In this specification, "GPS" and "GNSS" shall be used interchangeably to mean any remote satellite intercommunication system used for determining the global position of a satellite signal receiver module onboard the decoy for use in determining a position or velocity of the decoy while in motion and for generating navigation commands sent to either or both the rudder and propulsion motor.

Once the "set" command is received, the micro-controller energizes the propulsion motor and rudder motor so that the decoy swims about along randomized straight or curving courses, while steering at times so as to remain within a specified distance of the set point as seen at [1*b*,] until the decoy is retrieved by wading into the water. The user then turns the power switch of the decoy to "off," which de-energizes all motors and circuits.

Alternatively, a second "off" button on the hand-held controller may be used to emit a "standby" command which the microprocessor receives and then de-energizes the propulsion motor, and optionally issues a rudder command to set the rudder to a neutral or "amidships" position. In this "standby" mode, the decoy would begin to drift again, and upon being carried to a new desired position, the user may then press the "set" button again, and the decoy will power its propulsion motor and begin moving about while remaining within the specified distance from the new set point.

If there is little to no current such as in a pond or other stagnant body of water, and a favorable on-shore wind is present, the user may be able to end the activity by pressing the "standby" button on the controller and wait for the wind to push the decoy to the shore and collect it there to turn the power switch off, thus avoiding a having to wade out into the water to retrieve the decoy.

In preferable embodiments the hand-held controller includes no more than two momentary contact pushbuttons, or a single on/off latch and release pushbutton, with no need for steering wheels, levers, joy sticks, or other features conferring excess complexity. No hand-eye coordination or dexterity at operating a dynamic control is required. Thus the self-propelled, station-keeping decoy of the invention offers novel and welcome simplicity in a world filled with gadgets rife with unnecessary controls, features, and options. The simplicity of the design and operation of this decoy comports well with the pleasures of hunting: getting out to enjoy nature and forgetting about complex tasks usually associated with work.

Figure 3:
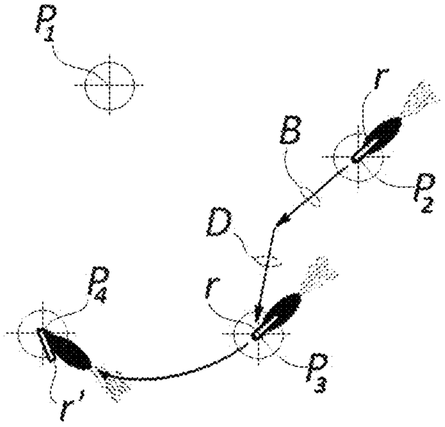
FIG. 3 shows a stylized diagram of a waterfowl decoy in accordance with the invention executing a station-keeping navigation operation.

FIG. 3 shows a stylized diagram of a waterfowl decoy in accordance with the invention executing a station-keeping navigation operation. When the decoy power switch is turned on, the microprocessor boots up and the GPS or GNSS receiver attempts to acquire connectivity to a plurality of satellites.

The absolute position of a GNSS receiver may be determined when the signal from four or more GNSS satellites may be clearly received at the same time. In dynamic applications such as the decoy of the invention while in motion, the position of the GNSS receiver may be verified repeatedly over a period of time while tracking and navigation applications are operating.

GNSS signals sent by radio from satellites have extremely accurate time stamps along with other information encoded in them. The precision and accuracy of these coded signals are generated from highly accurate atomic clocks on board each satellite. Once the GNSS receiver in the decoy determines its position, the GNSS receiver synchronizes its internal (although less accurate) clock with the satellite clocks. By maintaining this synchronization, the GNSS receiver clock is then considered to have a very accurate timing source.

Included with the previously filed provisional application specification is an Appendix to the Specification. The appendix includes additional inventor notes governing specific exemplary embodiments within the scope of the invention and also some Arduino and Raspberry Pi manufacturers' data sheets, and articles describing hobby radio control components and how to interconnect these elements to create the "microprocessor" of this specification. The entire contents of both files comprising the Appendix to the provisional application specification are incorporated into this application specification by reference.

After the user sends a "set" command to the decoy, the GNSS module queries the satellites for coordinates of its immediate position and stores them as position [$P_1$.] The GNSS regularly requests coordinates of the decoy at an interval such as once per second. In the figure, a decoy navigating so as to keep station within a predetermined radial distance from [$P_1$] is shown at position [$P_2$,] where the microprocessor commands the GNSS module to request current position coordinates. Upon receiving and decoding the responses from the satellites, the current position [$P_2$] is also stored in the microprocessor memory. After the next interval elapses, the microprocessor sends the next command to the GNSS module to request updated current position coordinates, and these are decoded and stored as position [$P_3$.] "Current position" [$P_3$] will differ from "old position" [$P_2$] by the vector sum of the motor propulsion producing a velocity and displacement [B] along the bearing of the decoy plus the displacing effect of wind and current or both producing a drift [D.] The decoy's rudder is shown amidships pending the generation by the microprocessor of a rudder command.

The microprocessor then calculates whether the decoy's current position [$P_3$] is close enough to [$P_1$] to allow a random rudder command to be generated or whether the decoy's position is far enough away from [$P_1$] to force the next rudder command to be biased in favor of steering the decoy towards [$P_1$.] In the exemplary situation shown in this figure, the decoy has strayed far enough from [$P_1$] that a software instruction to be executed next will pick a random number within a narrowed range only allowing the rudder to be set to steer the decoy towards [$P_1$.]

As an example, the physical limits or software limits of the rudder angle may be constrained to within 60° of amidships, recognizing that a rudder position more extreme than about 60° from amidships will act as a brake and slow the decoy down, thus wasting battery power and total available running time for the decoy. In the above event where the software determines firstly, that [$P_1$] resides to starboard (right) of a line extending from [$P_2$] to [$P_3$,] and secondly, that the current position of the decoy [$P_3$] is far enough away from set point [$P_1$] to force a course correction towards set point [$P_1$,] then the range of an acceptable random number to be used for the next rudder command may be constrained to within "right 20° rudder" and right 60° rudder." Depending on the software, the range of the random number may be constrained by a program expression, or a loop may be programmed so that a random number is generated, compared to the acceptable range, and rejected if it is outside the acceptable range, and then execution returns to pick another random number. These program loops typically execute thousands of times faster than the one second interval for position update requests by satellite, and so it is eminently feasible for the software to first numerically constrain and then select an acceptable rudder command value.

The decoy shown at position [$P_4$] has turned to approach setpoint [$P_1$.] With no drift forces the decoy would have turned in a circular arc or nearly so, but under the effect of drift [D] the decoy turns in an elliptical arc. The next position update will store [$P_3$] as the "old position" and store [$P_4$] as the "new" or "current" position for calculating the next allowable range of a rudder command value. Drift [D] as shown is working against the software's attempt to steer the decoy closer to [$P_2$] and so in this example it is likely that the software will constrain the allowable range of the next rudder command to continue a right turn or even a "right full rudder" command.

According to some versions of control software in accordance with the invention, the allowable range of the next rudder command may be selected as a function of the computed distance from the decoy's current position and the set point. The function may employ one or more Heaviside step functions, producing one or more constrained ranges of available values for the next rudder command. Propulsion speed may also be varied according to distance from the decoy to the set point; in preferable software embodiments motor speed may be reduced while the decoy is close to the set point and increased if the decoy is further from the set point. If the drift is strong, the decoy will spend much of its time and stored power steering directly or nearly directly towards the set point at full motor power.

Figure 4:
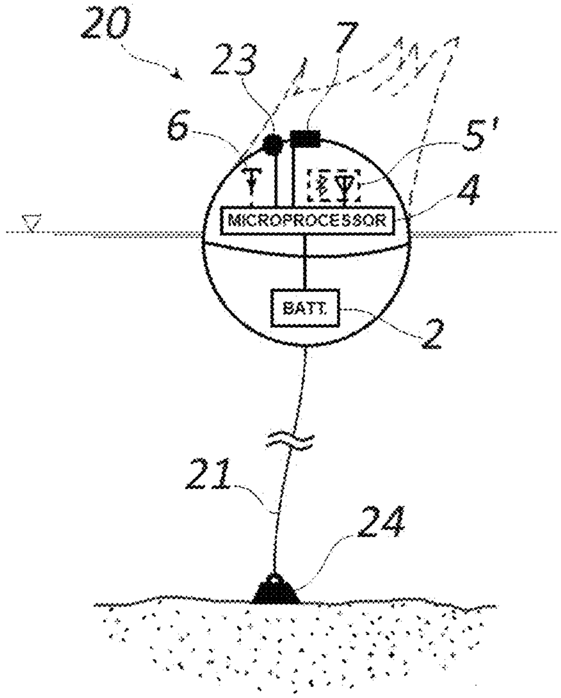
FIG. 4 shows a stylized schematic view of a preferred embodiment of a homing buoy for use by self-propelled station keeping waterfowl decoys in accordance with the invention.

FIG. 4 shows a stylized schematic view of a preferred embodiment of a homing buoy [20] for use by self-propelled station keeping waterfowl decoys in accordance with the invention. The body of the decoy may be of any arbitrary shape such as two conjoined hollow hemispheres or half-ovoids to form a sealed buoy which is openable to access the internal components. The homing buoy may also be sized, shaped, and decorated in the form of a decoy waterfowl, or may be painted or colored in a camouflage color or color scheme designed to blend into a natural environment. In this figure, an alternative form of the buoy is presented as a dotted line outline of a waterfowl in a "dabbling" position with its rear end raised nearly vertically out of the water.

Alternatively, local boating regulations may require that the exterior color scheme of the buoy include at least a portion which is highly visible and distinguish-able on the water so that boaters not involved with the hunt may spot and avoid collision with the decoy. Also, a portion of the decoy body may be transparent so that any of at least one status indicating light source within the buoy may be observed while in operation. A light source in this specification may be an LED (Light Emitting Diode) or an incandescent lamp, although LEDs are preferred because of their superior economy of power consumption and the variety of available colors so that the user may be informed of which functions are enabled or in process by looking at the microprocessor, daughter board, or other status indicator panel embedded within the buoy.

The homing buoy includes a battery [2] which may be a unitary dry cell or wet cell, or may be a battery pack which is an assembly of individual cells wired in series or in parallel or in series-parallel for providing a desired current and voltage output. The battery may include user-replaceable cells wherein depleted cells may be replaced with fresh, fully charged cells which themselves may be disposable or rechargeable cells. Alternatively, the battery may be a permanently installed rechargeable unit or assembly. The battery includes metal ions which make it one of the densest and heaviest components of the assembly, and is preferably located below the center of buoyancy of the entire homing buoy assembly so that its mass acts as a stabilizing ballast to the assembly while afloat, so as to advantageously orient antennae favorably within the assembly.

In use, the buoy is attached to an anchor [24] by means of anchor line [21.] After actuating a power switch [7] to boot up the microprocessor [4,] a "ready" light source within the buoy illuminates and is visible through an inspection window [23.] Illumination of status lights may be carried to the inspection window by one or more light pipes. Status lights for the self-propelled station keeping decoys themselves may include light pipes which may be seen and checked by a user looking into either or both eyes of the decoy.

Microprocessors in the buoy and the decoys may include one or more Bluetooth® or Bluetooth® Low Energy modules, or other low-power devices built to operate within the vehicle automotive collision radar spectrum, which is about 77 GHz. The beacon emitting antenna [6] may be connected to the main microprocessor [4] PCA or it may be incorporated onto a separate PCA [5'] configured for radio beacon signal transmission. For effective radio direction finding, receiving antennae arrays operating on the Bluetooth frequencies would be spaced apart by about 10 cm-30 cm, which may be suitable for building inside decoys for larger waterfowl such as Canada goose, but for ducks or other smaller waterfowl replicas, an array of smaller antennae may be preferable and at the 77 GHz frequency these may be sized and spaced about 3.9 mm apart or less.

Figure 5:
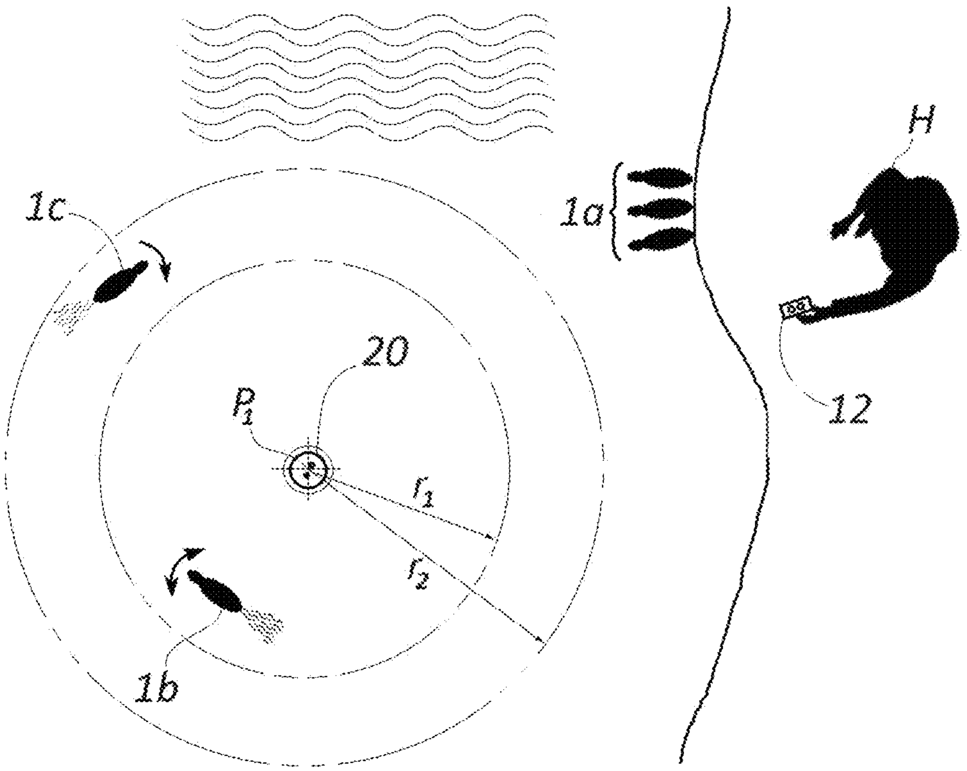
FIG. 5 shows a stylized top view of a user of a plurality of alternative inventive waterfowl decoys similar to that shown in FIG. 1 but having Bluetooth® interconnectivity enabled for station keeping in proximity of the homing buoy of FIG. 4.

FIG. 5 shows a stylized top view of a user of a plurality of alternative inventive waterfowl decoys similar to that shown in FIG. 1 but having Bluetooth® interconnectivity enabled or higher frequency radio emissions for station keeping in proximity of the homing buoy of FIG. 4.

According to yet other possible configurations of the invention, in operation the decoy may be configured to turn towards the homing buoy once it exceeds 2 to 10 meters from the buoy position. While within a predetermined proximity radius [$r_1$] to the buoy, the decoy [1*b*] will swim in a series of randomly generated directions. It will maintain a set speed and may or may not increase power to negotiate wind or obstacles. Collisions with obstacles such as logs, other floating or submerged objects, or other decoys operating within the homing radius of the homing buoy may physically and randomly redirect the decoy, but changes in numerical bias for randomly generating the next course would only be effected if the decoy [1*c*] detects that it is far enough from the homing buoy so that the program software logic excludes any rudder commands other than for reversing course to head towards the homing buoy. Beyond a second trip radius [$r_2$,] the only randomly generated commands which will be acceptable to pass to a rudder positioning subroutine will be commands for reversing course to mostly head directly to the buoy.

The propulsion motor and rudder enable up to 180 degree turns, preferably by means of software holding the rudder at one extreme or the other until the decoy detects that it is pointing directly toward the homing buoy at [$P_1$.] If the is decoy repeatably banging into a log, for example, a series of rudder commands will be generated and rejected until a command to set maximum turn in the direction of the homing buoy is generated. This command will be accepted and executed by the rudder positioning subroutine, so that even after a few more bumps eventually the decoy will turn around and maintain enough prop speed to make headway towards the homing buoy.

Software control varies the allowable rudder command range in proportion to the decoy's distance from the homing buoy. The allowable variation may vary as a linear distance, or it may force exponentially extreme commands only near the limit of the radius [r2] circle, while allowing mostly random steering, as long as the decoy is "close enough" (such as within radius [$r_1$.]) Also, software allows the decoy to loaf along and save battery power while "close enough" (such as within radius [$r_1$,]) but if it drifts too far then the motor will be allowed to run at full power while the rudder is only sent commands which are most likely to steer the decoy straight back towards the homing buoy, and thereafter maintaining little to no randomness allowed while it is beyond radius [$r_1$.]

In this figure the user [H] powers up the homing buoy and observes that the appropriate status lights show a successful boot up of its software. The user then throws or casts the buoy and its anchor to a desired set point [$P_1$.] The user may employ leverage such as a sling or a tool like a lacrosse stick to cast the homing buoy farther from shore than would be possible by human arm. The user then powers up one or more self-propelled station keeping decoys [1*a*] in accordance with the invention, and these then swim out towards the buoy if it is transmitting a homing signal.

According to one alternative within the scope of the invention, the homing buoy begins transmitting a homing signal as soon as it is powered up and the underlying operating system has stabilized and begins to execute preprogrammed instructions. In another alternative within the scope of the invention, a powered-up buoy awaits a "go" command from a handheld controller and then begins transmitting the homing signal. The decoys at [1*a*] remain idle if they do not detect a homing signal, but when they acquire the homing signal they begin to swim towards the homing buoy. A "stop" button on the handheld controller causes the buoy to stop transmitting its homing signal and revert to a standby mode awaiting another "go" signal. If a decoy cannot acquire the homing signal then its motor shuts off and the decoy drifts.

While far from the buoy they predominantly navigate directly towards the homing signal, but their courses are allowed to become increasingly random the closer they get to the buoy. As a plurality, the random motions of a number of active decoys will realistically appear to be a flock of waterfowl swarming around something interesting, such as edible matter. This action of swarming around a point is likely to attract other waterfowl on the wing, as their instincts steer them to join the flock and investigate or act out a territorial imperative.

Figure 6:
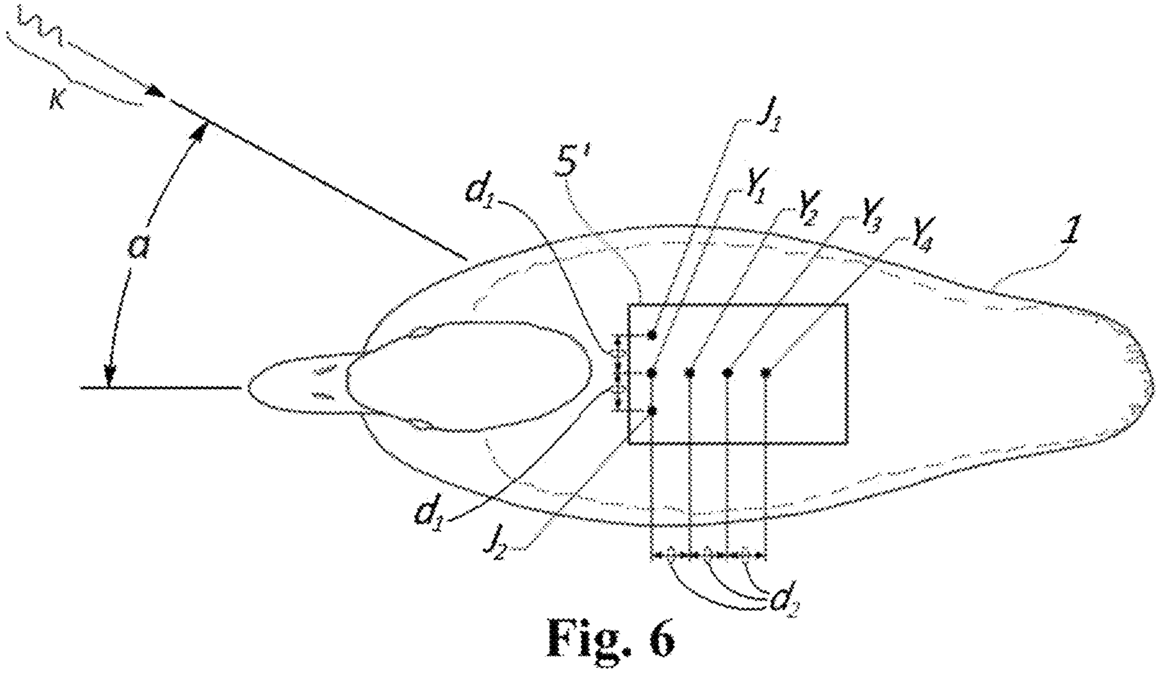
FIG. 6 shows a stylized top view of a station keeping duck decoy in accordance with the invention and having a T-array of antennae for radio direction finding while receiving a beacon signal from a homing buoy also in accordance with the invention.

FIG. 6 shows a stylized top view of a station keeping duck decoy [1] in accordance with the invention and having a T-array of antennae for radio direction finding while receiving a beacon signal [K] from a homing buoy also in accordance with the invention. The antennae may be mounted on the main microprocessor board or may be mounted on an application specific daughter card PCA [5'] having electronic and semiconductor components specific for navigational computation by digital or analog means.

Radio direction finding, the task of determining the direction of a signal from a receiving apparatus to its source, was first investigated by Heinrich Hertz in the 19th century and fairly well understood and deployed by the time of World War II, including notable advances in the art made by the US Coast Guard during the Prohibition years. Pinpointing the sources of radio transmissions was a useful tool for identifying and proving criminal activities, and for guiding Coast Guard cutters so they could find and seize vessels carrying contraband. The self-propelled and autonomously navigating decoys of the invention have a similar but simpler task, and the novel T-array disclosed herein accomplishes this task at minimal complexity and size.

The direction-finding T-array may be incorporated into the main processor PCA or may be constructed on a specific PCA such as [5'] as shown in this figure. The T-array includes a first, transverse array comprising antennae [$J_1$,] [$Y_1$,] and [$J_2$] for determining only whether the homing buoy signal [K] is to port or starboard (left or right) of the decoy. The second, longitudinal array comprising antennae [$Y_1$,] [$Y_2$,] [$Y_3$,] and [$Y_4$] is used to determine the angle [a] from the bow (the head and duckbill of the decoy) to the origin of the homing signal. The longitudinal array alone may determine an angle of approach (AoA) but a signal from the same angle coming in from the exact opposite side of the decoy would be identical and indistinguishable from a homing signal received from the correct side. Thus with these two arrays, both a determination of the angle on the bow and a binary determination of which side of the decoy the homing signal lays may be made.

The spacing of antennae for the transverse array in this example is [$d_1$,] and the spacing of antennae for the longitudinal array is [$d_2$,] which may be the same or different from [$d_1$.] Preferred values for [$d_1$] and [$d_2$] reside at about one-half the wavelength of the carrier frequency of the homing signal emitted by the homing buoy, or less. Thus for Bluetooth 2.4 GHz signaling, unless digital modes are used, the preferred spacing of antennae would be about 0.125 m or about 4.9 inches apart. This spacing would result in an array of about 8" wide and 12" long, which may be practical for concealing inside larger decoys such as a Canada goose, but for smaller waterfowl, a higher frequency signal would be more preferred, such as within the 7.125 GHz to 24 GHz allocation common within the United States or the 77 GHz vehicle collision radar band mentioned previously. Using 7.125 GHz as an example, the longitudinal and transverse arrays would occupy a space 42 mm wide by 63 mm long, or 1.65 inches wide by 2.48 inches long, which accommodates smaller waterfowl.

Figure 7A:
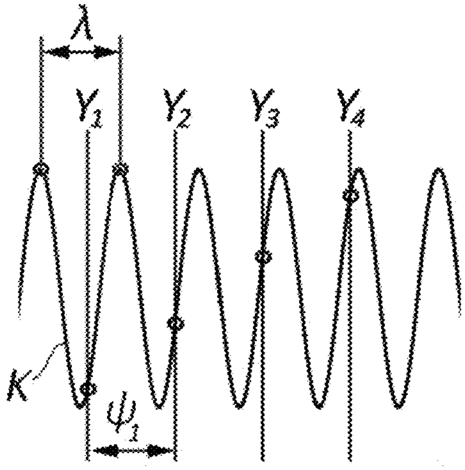
FIG. 7*a* shows the beacon signal of FIG. 6 being received by the longitudinal array of the T array of the station keeping duck decoy of FIG. 6.

FIG. 7*a* shows the beacon signal of FIG. 6 being received by the longitudinal array of the T-array of the station keeping duck decoy of FIG. 6. Beacon signal [K] is a sine tone received by antennae [$Y_1$,] [$Y_2$,] [$Y_3$,] and [$Y_4$] in sequence. The sine tone has a wavelength of [$\lambda$.] By a process known as in-phase and quadrature sampling (IQ Sampling) an IQ sample includes the wave's amplitude and phase angle represented as a set of Cartesian coordinates. Software computation is then used to transform this Cartesian representation into corresponding polar coordinates that yield the phase angle [$\psi_1$] and the amplitude value. The "angle on the bow" [a of FIG. 6] may be calculated with the distance [$d_2$ of FIG. 6] by the equation:

$$[a] = \arccos((\psi_1\lambda) \div (2\pi d_2))$$

The computed angle on the bow [a] does not discriminate between whether the signal source originates to the left or the right of the linear antenna array, but it does determine whether or not the source is ahead of or astern of the decoy by the order in which the signal is received along the array.

Figure 7B:
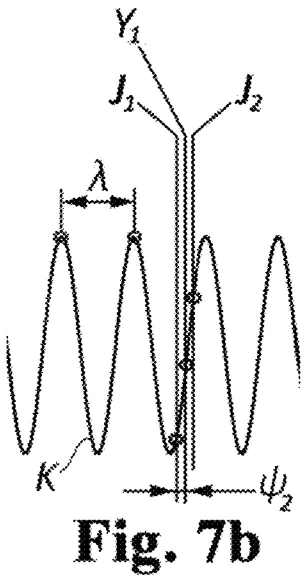
FIG. 7*b* shows the beacon signal of FIG. 6 being received by the transverse array of the T array of the station keeping duck decoy of FIG. 6.

FIG. 7*b* shows the beacon signal of FIG. 6 being received by the transverse array of the T array of the station keeping duck decoy of FIG. 6. In this example the sine tone [K of FIG. 6] is received in sequence by antennae [$J_1$,] [$Y_1$,] and [$J_2$] of the transverse array. Since the purpose of this array is only to determine from which side of the decoy the signal is arriving, although it is possible to determine phase angle [$\psi_2$] and calculate an angle from a theoretical beam (a line 90° transverse to the decoy) such a calculation analogous to [a] above is not necessary. Only confirmation of the order in which the signal is received along the array is required, which is one means by which the radio direction finding (RDF) array and processing system of a decoy in accordance with the invention differs from other RDF systems past and present. As with the ambiguity above, the determination of left vs. right by the transverse array does not discriminate whether the buoy is ahead or behind (astern of) the decoy, but in combination with the angle determination of the transverse array only one data combination is possible, and the computation of angle on the bow [a] is ready for further software steps.

The amplitude value of either the transverse array or the longitudinal array may then be used to compute a distance to the homing beacon by an inverse square calculation or a received signal strength (RSS) calculation. The resultant value is compared to predetermined values set by factory trials so that signal strength may be compared against reference values related to signal strength at radii [$r_1$] and [$r_2$.] This may be done by calibrations with a reference buoy and a decoy by measuring and recording RSS while the decoy is physically located at radius [$r_1$] from the factory signal source and then measuring and recording a second value with the decoy at distance [$r_2$.] The recorded values are then programmed into the decoy's software as reference values.

Figure 8A:
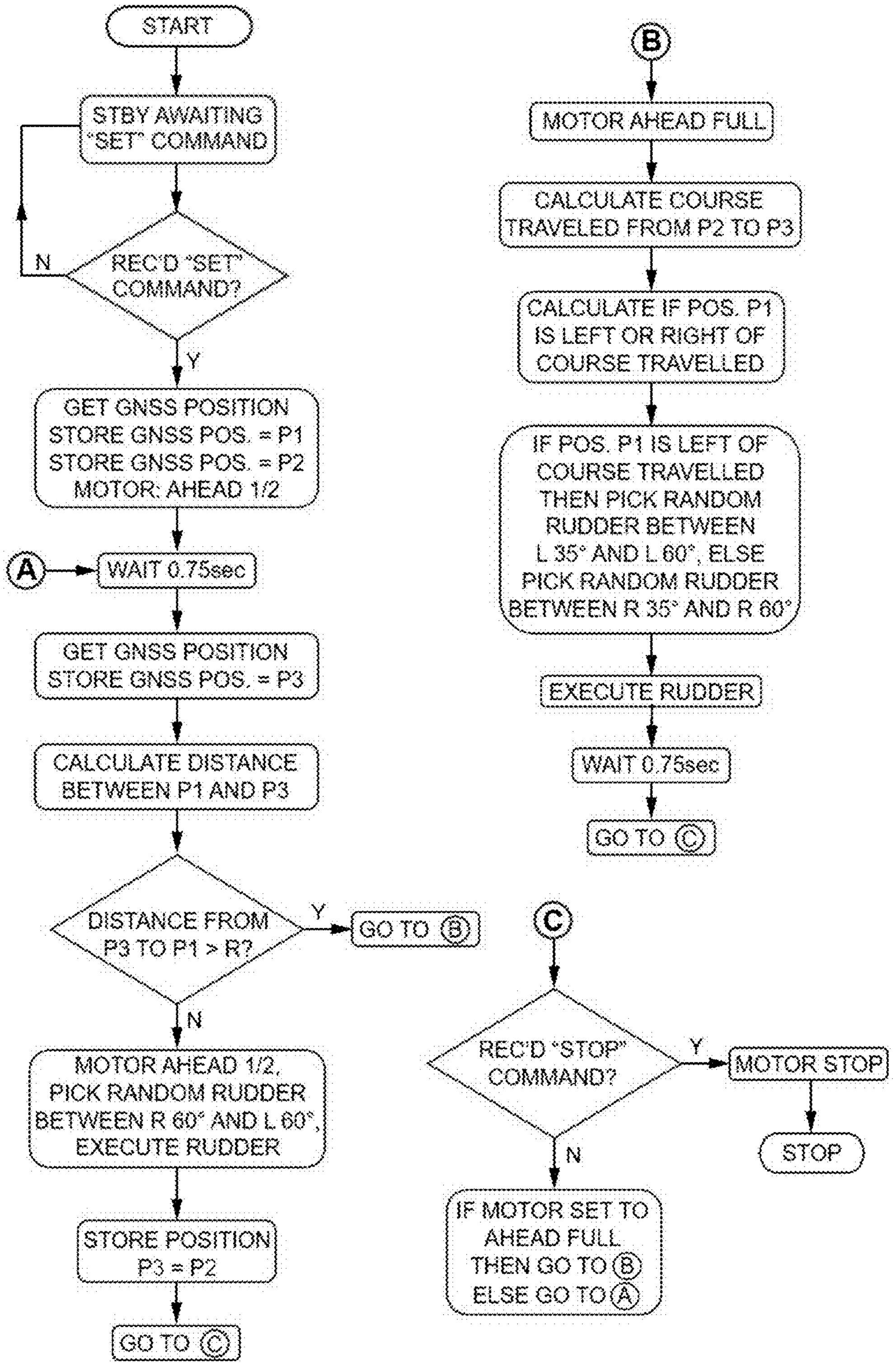
FIG. 8*a* shows a pseudocode flowchart for a GNSS navigation protocol for a self-propelled station keeping decoy of the type seen in FIGS. 2 and 3.

Pseudocode flowcharts for software operating within various embodiments of a self-propelled station keeping decoy in accordance with the invention may now be set forth. FIG. 8*a* shows one example from among a number of possible implementations within the scope of the invent-tion of software for a station keeping decoy maneuvering autonomously as seen in FIG. 3. No homing buoy is used with this type of decoy. FIG. 8*a* shows a pseudocode flowchart for a GNSS navigation protocol for a self-propelled station keeping decoy of the type seen in FIGS. 2 and 3. These pseudocode flowcharts present specific examples of possible programming instruction sets within the scope of the invention which allow a decoy in accordance with the invention to keep station around a set point or a homing buoy. Specific values such as rudder limits and motor speeds also comport with specific examples set forth in this specification. Other limits and values which effect station keeping navigation commands and functions also remain within the scope of the invention.

Turning the power switch on boots up the microprocessor and execution starts at the START block. Execution then loops while awaiting receipt of a "set" command, which is a radio signal from the handheld controller. The "set command" breaks execution out of the loop, and execution proceeds to a navigation phase. First, the decoy queries the GNSS for its geophysical coordinates.

This position is stored as [$P_1$] which is the center or anchor point of the desired circular swimming area seen in FIG. 2. The propulsion motor is now set to "ahead one-half," which is a partial thrust condition. The rudder position remains undefined at this point and may be the rudder position at the moment the decoy was turned off at the end of its last use. Besides reference position [$P_1$,] the immediate position coordinates received from the GNSS are also stored as a "last known" position [$P_2$.]

The decoy is allowed to proceed on its current course, at half speed, for 0.75 sec. Then the GNSS is polled again for current position, which is stored as position [$P_3$.] A computation is made by the microprocessor to calculate the distance between the set point [$P_1$] and the current position [$P_3$] of the decoy. A comparison of this distance is made against the reference maximum radius [R] of the swimming pattern. In FIG. 2 [R] is shown at 5 meters but a factory setting for [R] may be any other practical distance.

If the decoy is closer to the set point than the maximum permissible radius, then regardless of the current motor speed, the motor is now set as half-speed. If a decoy wanders too far off course as seen in subroutine B, the motor goes to full speed while navigation commands are selected to turn the decoy to head substantially straight for the set point. A decoy which was too far the last time it polled its GNSS position but which has now come back into the circular swimming area will cut motor power from full power to ahead one-half at this step.

Within the acceptable swimming circle, execution will use a random number generator to pick a random course within a range of right 60° rudder and left 60° rudder inclusively, as exemplary values. Rudder commands more then 60° may be practicable unless an extreme rudder angle causes the rudder to act as a brake rather than a steering tool, such as at or near 90° rudder. The new rudder command is executed, and the most recent position fix [$P_3$] is stored to overwrite the last known position [$P_2$.]

Execution now proceeds to [C] which is a poll to check whether or not the user has sent a "Stop" command from the handheld controller. If a "Stop" command is received, then the propulsion motor stops, and the decoy will begin to drift. In preferred software embodiments, execution reverts to the "Start" point and the decoy awaits a new "Set" command. If there is a steady wind or a current which the decoy is able to overcome, the user may issue several "Set" and "Stop" commands and the decoy will swim within a succession of set points along its direction of drift. If a "Stop" command has not been received, then whether the decoy is close enough or too far from the set point may be known by the motor speed. If the motor is running at full speed, then the last position check found the decoy beyond distance [R] of the set point [$P_1$] and so execution returns to [B] to determine a new course back towards the set point. Otherwise, if the motor is running at other than full speed, then it is running at half speed, which means that execution proceeds to [A.]

Now returning to the decision point where the distance from the set point to the decoy is more than [R,] execution proceeds to subroutine [B.] The decoy is too far from the set point, and the program causes it to attempt to turn towards the set point and proceed at maximum speed. To do this, first, the motor is set to full power. A vector spanning from previous position [$P_2$] to current position [$P_3$] is computed and these two points define a line which is the immediately previous course of the decoy's movement. A geometric calculation is made to query whether set point [$P_1$] lies above a line plotted in 2D space using points [$P_3$] and [$P_3$] in the line formula y=mx+b and testing whether [$P_1$] lies above or below that line. If above the line, then [$P_1$] is to the left of the decoy's course, otherwise [$P_1$] lies to the right of the decoy's course.

A random range for a rudder command is set to reside inclusively between 35° and 60° in the direction determined above for turning the decoy towards the set point, and then the computed rudder command is executed. The decoy runs for 0.75 seconds at full speed and then software execution proceeds to [C] as above, to check for whether or not a "Stop" command has been received.

Figure 8B:
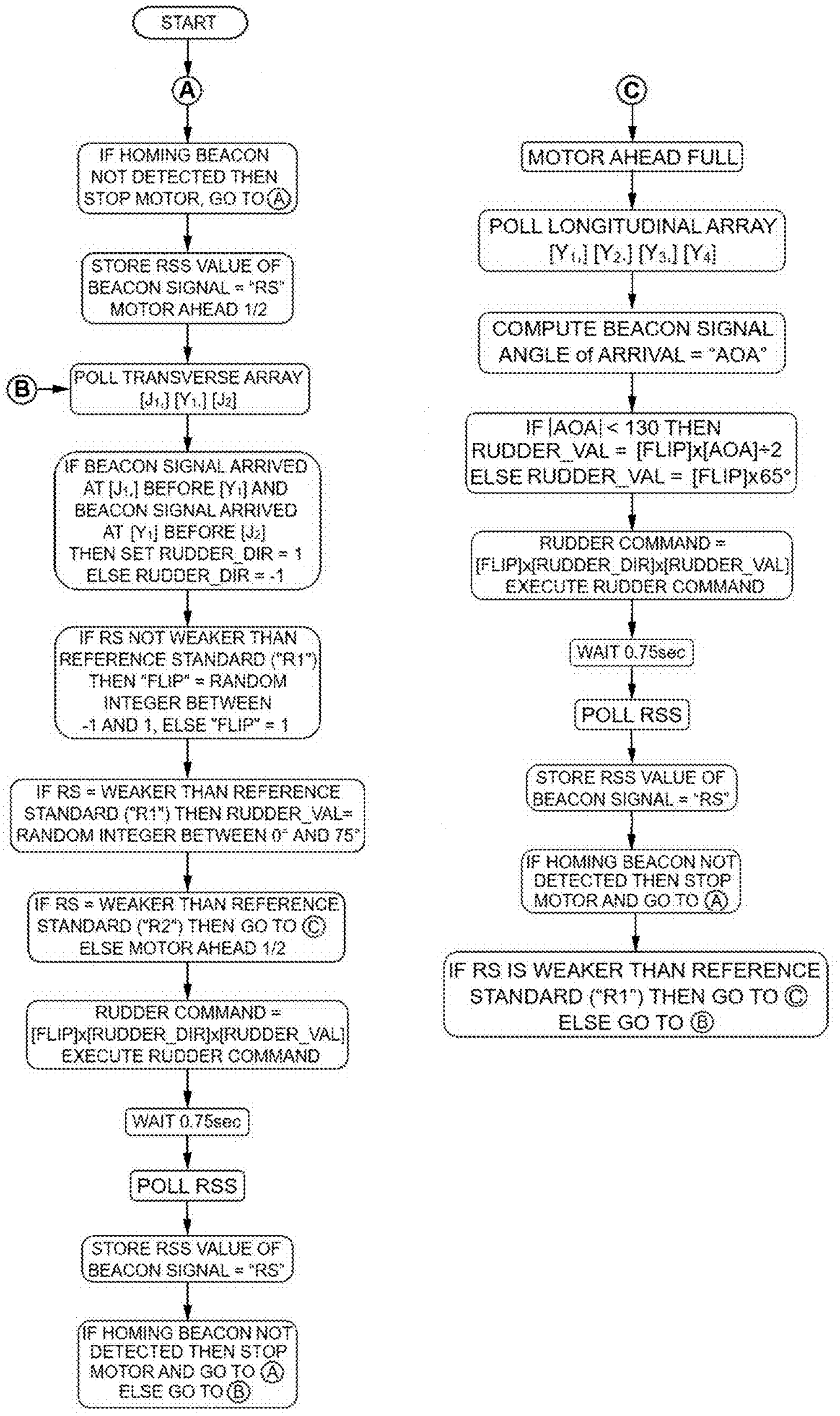
FIG. 8*b* shows a pseudocode flowchart for a navigation protocol for a self-propelled station keeping decoy of the type seen in FIGS. 5 and 6.

FIG. 8*b* shows a pseudocode flowchart for a navigation protocol for a self-propelled station keeping decoy of the type seen in FIGS. 5 and 6, which includes a homing buoy that emits a homing beacon signal when the user presses a button marked "Start" or "On" or a similar label. Turning the power switch on the decoy to its "on" position boots up the microprocessor and execution starts at the START block. A return point [A] may be separate from or the same as returning to "Start." The decoy waits for the homing beacon signal by skipping back to [A] until the homing signal is detected.

Once a signal is received, the received signal strength (RSS) of the signal is then checked at various times against two previously calibrated values set at the factory by testing the decoy at two distances [R1] and [R2] from a reference standard source signal. A decoy first receiving a homing beacon signal turns its motor on at half speed.

Next, execution polls the transverse array [$J_1$,] [$Y_1$,] and [$J_2$.] A determination of whether the homing beacon source lies to the right or the left of the decoy is made by checking the order in which the signal hits antennae [$J_1$,] [$Y_1$,] and [$J_2$.] Alternatively, a computation of the angle of arrival may be made, with 90° abeam of this linear array representing that the signal is either dead ahead or dead astern of the decoy. The transverse array cannot determine whether the signal source is ahead or astern of the decoy, it can only determine to which side of the decoy the signal source lies. To bias the next rudder command if necessary, an integer, binary, or ternary variable "FLIP" is set at either +1 or −1. In the example pseudocode, +1 is set for when the signal source lies to the right of the decoy and −1 is set when the when the signal source lies to the left of the decoy.

Execution now determines the distance from the homing signal buoy to the decoy by assessing the received signal strength (RSS) at the array. Either array or even a single antenna from either array may be used for RSS checks. A digital value proportional or related to the received signal strength has been previously stored as variable "RS." This value is now compared to a calibrated and permanently stored digital value for an RSS when the decoy is a distance [$r_1$] from the homing signal buoy. At this point, if the decoy is within the distance [$r_1$] from the buoy, a software step allows the value of "FLIP" to be randomly reset as either +1 or −1. This step randomizes the left or right direction of the next rudder command, which is allowable because the decoy is close enough to the buoy to permit random turns. If the decoy is not close enough, then the direction of the next rudder command will remain a direction to turn the decoy towards the buoy, even when the decoy is heading away from the buoy. In more nautical terms, while the decoy is farther away from the buoy than distance [r1,] then if the buoy lies astern of the decoy off the port quarter, then the next rudder command will be a turn to port, and vice versa for when the buoy lies astern off the starboard quarter, then the next rudder command will be a turn to starboard. If the decoy is closer than [$r_1$] to the buoy, then a random turn will be picked.

Next, a random number between 0° and 75° is picked for the rudder value "RUDDER_VAL." Depending on the rudder shape and the fluid dynamics of that shape, a rudder rotated past more than about 50° may begin to act more as a brake to forward motion than an angled blade in water generating a turning force on the decoy. This braking effect may be beneficial for further randomizing not only the course but also the speed of the decoy, resulting in more unpredictable and life-like motion.

In the next software block, the RSS value is checked again to determine whether the decoy is more than a distance [$r_2$] from the homing buoy. If this condition is true, then the highest priority will be to drive the decoy back to the buoy and to persist with that task until the decoy has returned to within distance [$r_1$] of the decoy. This navigation task is handled by subroutine [C] of this figure. A decoy operating in subroutine [C] will run its motor at full speed. If this "decoy is too far" condition is not true, then the motor will currently be running at half-speed. However, in the event that execution has just returned from subroutine [C] with its motor at full speed, then this check of whether the "decoy is too far" will, if newly satisfied, this will now become false and the motor will slow from full speed down to half speed.

After the proximity check, execution builds and executes the next rudder command. The value of FLIP multiplied by RUDDER_DIR multiplied by RUDDER_VAL will create a random rudder command. If the decoy is within distance [$r_1$] then the rudder direction "FLIP" will be randomized left versus right, otherwise it will be value 1 and not possibly invert the value RUDDER_DIR. The resultant value will be a random rudder command between 0° and 75° rudder which, if the decoy is further from the homing signal buoy than [$r_1$,] will always turn the decoy back towards the buoy.

The decoy will drive for 0.75 seconds and then poll for RSS to check its distance, and store the updated distance as a signal strength value. Before returning to poll the transverse antennae array for an updated orientation, a check is made as to whether the decoy is still in contact with the homing beacon signal. If so, then execution returns to [B] and navigation continues. If not, then reasons for the homing beacon signal being lost would include: (i) the user has decided to end the decoy swimming activity by pressing "Stop" or "Off" on the handheld controller, (ii) the battery power on board the homing beacon buoy of FIG. 4 has been depleted, or (iii) winds or currents stronger than the decoy can overcome have carried off the decoy out of range of the homing beacon signal. In any of these three cases, the decoy motor stops and execution returns to [A] to await whether the beacon signal resumes.

If the decoy receives the homing beacon signal while it is more than distance [$r_2$] away from the homing buoy, then execution proceeds to subroutine [C.] This subroutine will attempt to steer the motorized decoy directly back to the homing buoy or nearly so. While subroutine [C] is active, the motor is set to full speed. Thereafter, the longitudinal array [$Y_1$,] [$Y_2$,] [$Y_3$,] and [$Y_4$] is polled and an angle of arrival (AoA) computation is made. This computation alone can only determine an "angle on the bow" [angle "a" of FIG. 6] and cannot tell whether the buoy lies to the left or right of the decoy.

Successive iterations of subroutine [C] will drive the decoy to hold a turning course leading back to pointing straight at the homing buoy or nearly so, and this subroutine will remain active until the decoy has returned to within distance [$r_1$] of the homing buoy. The rudder, once set in a turning direction, will stay on that side until the decoy is pointing at or nearly at the buoy. During the corrective turn, if the decoy is pointing more than 130° away from the way back to the homing buoy, the rudder will set no more than 65° in the corrective direction. The software at this step may use the absolute value of the rudder angle, because only a conditional of whether or not the decoy's heading is more than 130° away from the homing signal direction is being tested. If a random wave or wind buffets and rotates the decoy so much that the bearing back to the homing buoy crosses its tail so as to lie opposite from the last poll of the transverse antennae array, the rudder will nevertheless hold at 65° and continue turning in the initially preferred direction when subroutine [C] started, so that relative to the decoy the bearing to the homing buoy will cross dead aft of the decoy as it completes this long, corrective turn.

When the decoy comes about enough to be pointed at an angle less than 130° away from the homing buoy, the rudder angle will be set to one-half of the angle on the bow of the homing buoy, and decreasing to zero (amidships) as the decoy takes a roughly elliptical arc course back into the circular swimming area of radius [$r_1$] around the homing buoy. In an alternative software embodiment in accordance with the invention, software may poll the transverse array during subroutine [C,] determine if the bearing of the homing signal has crossed past the head of the decoy, and then adjust the "FLIP" direction so that the decoy approaches the homing buoy on a serpentine course.

Next, the distance from the decoy to the homing buoy is checked again by polling RSS, and if the decoy has not yet returned to the circular swimming area within radius [$r_1$] then execution returns to the beginning of subroutine [C.] If the decoy has made it back to with distance [$r_1$,] then execution returns to the random swimming routine and the decoy will slow to one-half speed again. But if the decoy is still further than radius [$r_2$] and radio reception is lost, then execution returns to [A] wherein the decoy shuts the motor off and lays adrift and waiting to receive a homing beacon signal. This may happen because the user has hit "Stop" on the handheld controller.

The system may be used with more than one active decoy, with all of them swimming around at half-speed, and most turning randomly within radius [$r_1$] of the decoy and some strays beyond that distance turning to return within the [$r_1$] circle radius. Decoys which have ranged beyond distance [$r_2$] beyond the homing buoy will be turning to head substantially straight back toward homing buoy at full speed until they get back to within the [$r_1$] circle radius, whereupon they will return to half-speed and random turns. At the end of the activity, when the user turns off the beacon signal, all decoys associated with it will turn their motors off, and the user may wade into the water or take a boat to collect the decoys.

Figure 9A:
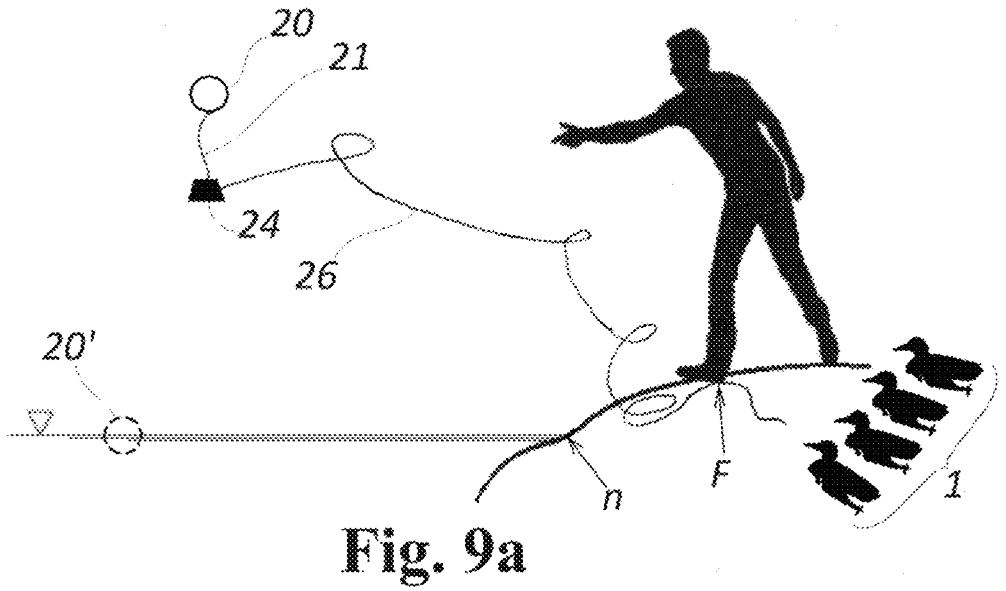
FIG. 9*a* shows a stylized elevation view of a user deploying a homing buoy having a retrieval lanyard in advance of deploying a plurality of station keeping decoys which will then swim out and maintain position in the vicinity of the homing buoy.

FIG. 9*a* shows a stylized elevation view of a user deploying a homing buoy [20] having a retrieval lanyard [26] in advance of deploying a plurality of station keeping decoys [1] which will then swim out and maintain position in the vicinity of the homing buoy. The lanyard is of a length at least as long as the users range in casting or throwing it off shore. It is shown attached to the buoy's anchor [24] but it may alternatively be connected to the buoy itself. To keep the free end of the lanyard on land, the user may step on it as shown at [F.] The free end may also be tied to some other large object or reasonably immovable tie-down point such as a stake driven into the ground.

If the lanyard is attached to the buoy, then it may be preferable that the anchor line [21] have a tensile strength less than that of the lanyard, so that when retrieving the buoy, if the anchor were to hang up on a submerged obstruction, then a strong pull by the user would part the anchor line while leaving the buoy attached to the lanyard. Because the buoy and its electronics are more expensive and valuable than an anchor, which is little more than an inert mass, it is far preferable to lose the anchor while saving the buoy.

With the buoy deployed at an offshore point [20'] the user may then power up the decoys and launch them from the water's edge such as at [n.] The decoys will acquire the homing beacon signal and propel themselves out to it and then follow their navigation instructions as disclosed herein and swim around in the vicinity of the buoy. Collisions between decoys are acceptable and life-like events. It is noteworthy that using decoys and a buoy in accordance with the invention, the user is able to deploy a set of self-propelled decoys to an offshore location without having to wade into the water and without getting wet.

Figure 9B:
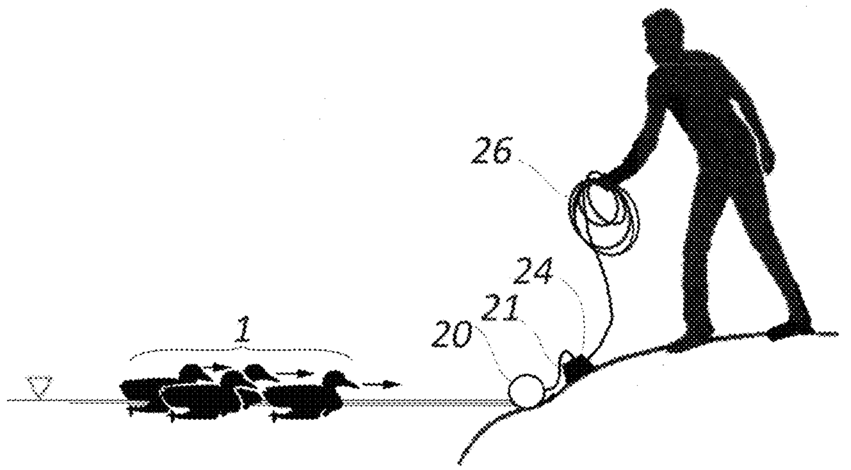
FIG. 9*b* shows stylized elevation view of a user having retrieved the homing buoy of FIG. 9*a* and with the plurality of station keeping decoys of FIG. 9*a* now following the buoy ashore.

FIG. 9*b* shows stylized elevation view of a user having retrieved the homing buoy [20] of FIG. 9*a* and with the plurality of station keeping decoys [1] of FIG. 9*a* now following the buoy ashore. The user has pulled the anchor [24] ashore and the buoy is attached to it by an anchor line [21.] As mentioned previously it is also within the scope of the invention to affix the lanyard [26] to the buoy. The station keeping decoys will continue to home in on the buoy's location and drive themselves ashore. The user may then retrieve them from the water's edge, again without having to wade into the water and without getting wet. Thus the invention provides a new, convenient, and comfortable mode of using motorized decoys to move in life-like patterns so as to attract other game birds, while eliminating a here-to-fore undesirable necessity of wading into water which even while wearing waterproof gear still transfers substantial amounts of heat out of the user's body. Wading into water and discovering that one's footwear is actually not waterproof, or accidentally wading deeper than its protection is a miserable experience of feeling warm and dry fiber turn wet and cold, and carrying the cold and soggy clothing even after having left the water. More people perish in the wilds at temperatures between 40° F. and 55° F. due to hypothermia after getting wet than perish at temperatures below freezing (32° F.)

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The values and limits presented in the discussion of pseudocode used to represent actual computer instruction code are specific examples and many other ranges and values, especially the distance ranges and rudder command ranges and limits, the radio frequencies used for controlling the invention, the number, type, and locations of antennae in the decoy, and whether or not application specific subassemblies such as for navigation, satellite communications, and radio receiving and transmitting are located on the same PCS as the microprocessor or are located on physically separate but operably connected auxiliary PCAs (i.e, "daughter cards") may be effective embodiments within the scope of the invention.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. A station keeping waterfowl system comprising:

at least one self propelled station keeping waterfowl decoy further comprising a decoy housing resistant to water entry, with at least a portion of said decoy housing having a form of a waterfowl, a first battery, a first microprocessor, a first power switch operably coupled between said first battery and said first microprocessor, a first propulsion motor with a propeller operably coupled thereto, a second rudder motor and a rudder operably coupled thereto, and a T-array of antennae comprising a first linear array of at least two antennae disposed transverse to a sagittal plane of said decoy housing, and a second linear array of at least two antennae disposed parallel to a sagittal plane of said decoy housing, and a homing buoy comprising a buoy housing, a second battery, a second microprocessor, a second power switch operably coupled between said second battery and said second microprocessor, and a beacon emitting antenna.

2. The station keeping waterfowl system of claim 1, wherein said homing buoy further comprises a command receiving antenna for receiving a radio command from a handheld controller.

3. The station keeping waterfowl system of claim 2, wherein said handheld controller comprises no more than two command buttons.

4. The station keeping waterfowl system of claim 1, wherein said homing buoy further comprises a status light within said housing and visible from outside said buoy housing.

5. The station keeping waterfowl system of claim 1, wherein said self propelled station keeping waterfowl decoy further comprises a status light within said decoy housing and visible from outside said buoy housing.

6. The station keeping waterfowl system of claim 1, wherein a portion of said buoy housing has a form of a dabbling waterfowl.

7. The station keeping waterfowl system of claim 1, wherein said transverse linear array comprises three antennae including a first antenna, a center antenna, and a second antenna arranged laterally across said decoy housing, and wherein said longitudinal linear array comprises at least four antennae arranged along a fore-aft axis of said decoy housing with a spacing between adjacent antennae less than or equal to one-half of a wavelength of said beacon signal.

8. The station keeping waterfowl system of claim 1, wherein said self propelled station keeping waterfowl decoy further comprises a GNSS receiver operably coupled to said first microprocessor, wherein said first microprocessor is configured to acquire a set point position from said GNSS receiver in response to a set command received from a handheld controller, and wherein said first microprocessor is further configured to periodically acquire subsequent positions from said GNSS receiver and control said first propulsion motor and said second rudder motor to maintain said decoy housing within a predetermined radius of said set point position.

9. The station keeping waterfowl system of claim 1, wherein said rudder is positioned forward of said propeller beneath a head portion of said decoy housing, and wherein said second rudder motor comprises a stepper motor configured to position said rudder at angular positions between negative sixty degrees and positive sixty degrees relative to a longitudinal axis of said decoy housing.

10. The station keeping waterfowl system of claim 1, wherein said homing buoy further comprises an anchor, an anchor line coupling said anchor to said buoy housing, and a retrieval lanyard coupled to at least one of said anchor or said buoy housing.

11. A self propelled station keeping waterfowl decoy comprising a housing resistant to water entry, with at least a portion of said housing having a form of a waterfowl, a first battery, a first microprocessor, a power switch operably coupled between said first battery and said first microprocessor, a first propulsion motor with a propeller operably coupled thereto, a second rudder motor and a rudder operably coupled thereto, and a plurality of antennae, with at least a first antenna from among said plurality configured to receive a GNSS signal, and said plurality further comprising a T-array of antennae comprising a first linear array of at least two antennae disposed transverse to a sagittal plane of said decoy housing, and a second linear array of at least two antennae disposed parallel to a sagittal plane of said decoy housing.

12. The self propelled station keeping waterfowl decoy of claim 11, further comprising a second antenna for receiving a radio command from a handheld controller.

13. The self propelled station keeping waterfowl decoy of claim 12, wherein said handheld controller comprises no more than two command buttons.

14. The self propelled station keeping waterfowl decoy of claim 11, further comprising a status light within said housing and visible from outside said housing.

15. The self propelled station keeping waterfowl decoy of claim 11, wherein said first linear array comprises three antennae including a first antenna, a center antenna, and a second antenna arranged laterally across said housing, and wherein said second linear array comprises at least four antennae arranged along a fore-aft axis of said housing.

16. The self propelled station keeping waterfowl decoy of claim 15, wherein a spacing between adjacent antennae is less than or equal to one-half of a wavelength of a beacon signal.

17. The self propelled station keeping waterfowl decoy of claim 11, wherein said rudder is positioned forward of said propeller beneath a head portion of said housing, and wherein said second rudder motor comprises a stepper motor configured to position said rudder at angular positions between negative sixty degrees and positive sixty degrees relative to a longitudinal axis of said housing.

18. The self propelled station keeping waterfowl decoy of claim 11, wherein said housing further comprises a head portion and a body portion, and wherein said head portion is configured as a rotatable actuator, and wherein rotation of said head portion relative to said body portion actuates said power switch to toggle power between an on state and an off state.

19. The self propelled station keeping waterfowl decoy of claim 11, wherein said housing further comprises a keel structure, and wherein said first battery is positioned within said keel structure below a center of buoyancy of said housing.

20. The self propelled station keeping waterfowl decoy of claim 11, further comprising at least one status indicator light positioned within said housing, and at least one transparent element configured as a light pipe optically coupled to said status indicator light, wherein said transparent element is positioned to transmit light from said status indicator light to an exterior surface of said housing such that said status indicator light is visible from outside said housing.

* * * * *